Feb. 10, 1970     E. H. E. MARTIN     3,494,380

INFLATABLE STRUCTURES

Filed July 27, 1966

# United States Patent Office 3,494,380
Patented Feb. 10, 1970

3,494,380
INFLATABLE STRUCTURES
Erwin Herbert Erhard Martin, Coventry, England, assignor to Dunlop Rubber Company Limited, Erdington, England, a corporation of Great Britain
Filed July 27, 1966, Ser. No. 568,165
Claims priority, application Great Britain, Aug. 10, 1965, 34,103/65
Int. Cl. B64d 33/02; F02b 27/02; F15d 1/00
U.S. Cl. 138—39                 9 Claims

ABSTRACT OF THE DISCLOSURE

A collapsible device which surrounds an opening in an aircraft and forms in combination with such opening a contoured air intake for an aircraft engine, comprising an inflatable envelope and inextensible fabric webs secured within the envelope to limit the expansion and so tailored that the envelope will assume a predetermined flared contour upon inflation of the device.

---

This invention relates to inflatable structures and particularly to inflatable intakes for aircraft engines, and is an improvement in or modification of the invention claimed in U.S. Patent No. 3,285,003.

The specification of U.S. Patent No. 3,285,003 relates to an inflatable device, and according to the invention claimed therein an inflatable device comprises an inflatable envelope in combination with an expansible supporting structure.

In a preferred form of the invention described in the parent application, a device which is inflatable to form an intake for an aircraft engine comprises an inflatable envelope and an inflatable supporting structure within the envelope. It has now been discovered that in certain circumstances the bulk of the supporting structure may cause difficulty in retracting the envelope when the intake is collapsed, and one object of the present invention is to provide an intake which can be collapsed into a small space.

According to the invention, a collapsible intake for an aircraft engine comprises an inflatable envelope arranged to be mounted in a recess formed in a housing surrounding the engine, and reinforcements to limit the expansion of the envelope on inflation thereof, the interior of the envelope being substantially free from obstructions which would tend to limit the extent to which the envelope may be collapsed.

The reinforcements of the intake in accordance with the invention are preferably in the form of a plurality of webs of inextensible fabric secured to the inside of the envelope and extending, in the inflated state of the intake, in radial planes containing the axis of the intake. The webs are secured to the envelope along their radially-extending sides and serve to hold the surface of the inflated intake to a predetermined contour.

Two embodiments of the invention will now be described, by way of example, with reference to the accompanying drawings in which.

Figure 1:
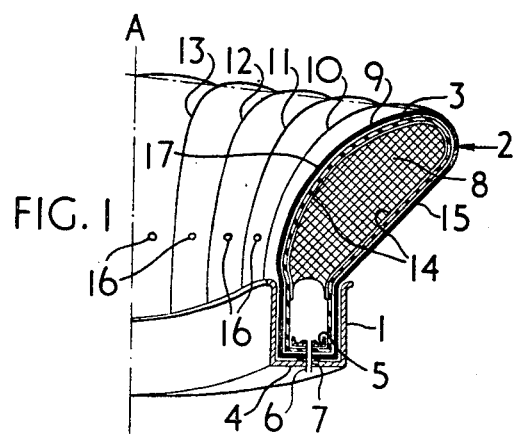
FIGURE 1 is a diagrammatic sectioned perspective view of a portion of a collapsible intake for an aircraft engine according to the invention extending around the axis A—A of the intake, and shown in the inflated state.

In order to provide lift for vertical take-off, a jet engine is mounted within the fuselage of an aircraft with its axis A—A disposed vertically. The intake end of the engine is adjacent the upper surface of the fuselage and is arranged to be covered by a sliding panel during normal flight, when the "lift" engine is not in operation, to improve the aerodynamic characteristics of the aircraft.

A housing surrounds the intake end of the engine and as shown in the drawings, is formed with a continuous annular recess 1 in which a collapsible intake 2 is mounted.

The collapsible intake 2 comprises an envelope 3 formed from fabric-reinforced rubber sheet and anchored at the base 4 of the recess 1 by a metal retaining ring 5 within the envelope which is secured by a series of bolts (not shown) to the housing. The bolts have heads secured to the ring and pass through the envelope in sealing engagement therewith and through holes in the base of the recess, nuts being threaded on the lower ends of the bolts remote from their heads to clamp the ring to the housing with the envelope sandwiched between the ring and the base of the recess. An inflation connector 6 is secured to the envelope in the conventional manner and passes through a hole 7 in the base of the recess for connection to an inflation control valve (not shown) which can be operated to inflate the envelope or to allow it to deflate.

The envelope 3 is reinforced internally by webs 8 of fabric formed from cross-woven substantially inextensible filamentary material. The webs 8 are disposed within the envelope 3 in positions around the entire circumference of the intake 2. In each of the drawings, the section has been taken through one such position 9 and further webs are located at the positions 10, 11, 12, 13, etc. at spaced regular intervals throughout the entire intake circumference. In the inflated state of the envelope the webs extend in radial planes containing the axis A—A of the engine and intake, and are secured to the envelope at their radially-extending sides 14 by adhesive or by vulcanization, the webs being tailored so that the shape assumed by the envelope on inflation is the flared shape required for an engine intake. The inflated envelope is arranged to project above the surface of the fuselage to provide an intake which greatly increases the efficiency of the engine.

In order to assist the collapsing of the intake when its inflation pressure is released, the fabric-reinforced envelope is provided with a separate rubber covering layer or outer skin 15. The dimensions of this layer when it is unstretched are such that it is stretched when the envelope is inflated. When the inflation pressure is released the tension in the covering layer acts to retract the whole intake structure into the recess. In the embodiment shown in FIGURE 1 the covering layer is also anchored at the base of the recess by the ring 5 as described above.

The covering layer 15 has bleed holes 16 formed therein on the part 17 thereof which forms the inner surface of the intake 2, the bleed holes being in the region of maximum air velocity, that is, near to the engine. These bleed holes provide outlets which act to withdraw any air which may have been trapped between the envelope 3 and the outer skin 15 on inflation of the intake, and thus ensure a good fit between the outer skin and the envelope and preservation of the required contour.

Figure 2:
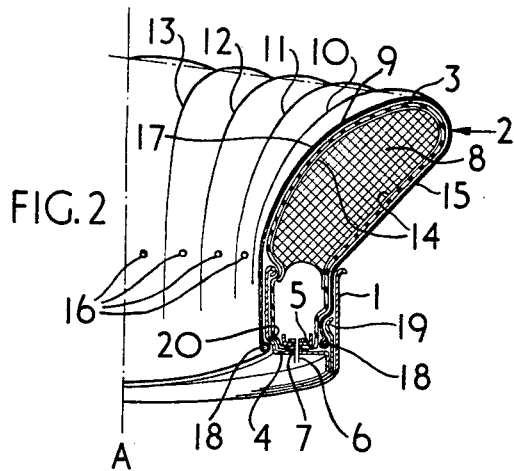
FIGURE 2 is a view similar to that of FIGURE 1 of an alternative embodiment of the invention.

In the construction shown in FIGURE 2, the rubber covering layer 15 has a circumferential open portion, and is provided with circumferential bead wires 18 at the edges of the open portion, adapted to hold the covering layer in engagement with the recess 1 formed in the housing. The beaded edges are arranged to fit, in the assembled state of the intake beneath radially inwardly projecting surfaces 19, 20 formed on the housing, the bead wires being of suitable diameter so that any forces tending to pull the covering layer from the intake are resisted by circumferential compressive stresses set up in the bead wires. The bead wires are sufficiently flexible to allow manual removal of the covering following a local inward deflection of a part of the bead.

The inflatable intake structure described above has the advantage that it can be completely collapsed into the aircraft fuselage, rendering it particularly suitable for use on lift engines, where the large bulk and weight of a conventional rigid intake would constitute serious disadvantages.

Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the invention to suit individual design requirements, and it is intended that such revisions will be included within the scope of the following claims as equivalents of the invention.

Having now described my invention, what I claim is:

1. An inflatable device for defining the intake contour of an aircraft engine, comprising an inflatable envelope arranged to surround an opening in the aircraft and expandable to form in combination therewith a contoured intake, means for retaining the envelope at its inner edge adjacent the edge of the opening, relatively inextensible reinforcements secured to the interior of the envelope to limit the expansion of the envelope upon inflation thereof, said reinforcements being tailored so that the shape assumed by the envelope on inflation is the flaired shape required for an aircraft engine intake, the interior of the envelope being substantially free from obstructions which would tend to limit the extent to which the envelope may be collapsed, said means for retaining the envelope at its inner edge adjacent the edge of the opening being disposed within said envelope, a separate rubber covering layer extending around the outer surface of said envelope, the dimensions of said separate rubber covering envelope when unstretched being proportioned so that the layer is stretched when the envelope is inflated and having formed therein a plurality of bleed holes on the portion thereof which forms the inner surface of said intake.

2. The inflatable device in accordance with claim 1 wherein said reinforcements are of fabric and extend in radial planes containing the axis of the device when the device is inflated.

3. An inflatable device according to claim 1 wherein said reinforcements are secured to the envelope by adhesive.

4. The inflatable device according to claim 1 wherein the reinforcements are secured to the envelope by vulcanization.

5. The inflatable device according to claim 1 wherein said envelope is formed from fabric-reinforced rubber sheet.

6. The inflatable device according to claim 1 wherein said retaining means is the form of a metal ring disposed within said envelope and a series of bolts adapted to secure said metal ring to an aircraft.

7. The inflatable device according to claim 6 wherein said bolts have heads secured to said metal ring and pass through said envelope in sealing engagement therewith and a plurality of nuts respectively threadedly received on said bolts at the lower ends thereof remote from said heads.

8. The inflatable device according to claim 1 wherein said separate rubber covering layer is adapted to be secured to the aircraft by the same means as said envelope.

9. The inflatable device of claim 1 wherein said covering layer has a circumferentially open portion and include circumferential bead wires at the edges of such open portion for holding the covering layer in engagement with the aircraft.

References Cited

UNITED STATES PATENTS

| | | | |
|---|---|---|---|
| 2,737,019 | 3/1956 | Billman | 138—45 X |
| 3,074,232 | 1/1963 | Soyer | 138—45 |
| 3,119,581 | 1/1964 | Trevaskis | 244—53.8 |
| 3,224,712 | 12/1965 | Taylor et al. | 244—53.8 |
| 3,285,003 | 11/1966 | Martin et al. | 138—45 |

FOREIGN PATENTS 832,512   4/1960   Great Britain.

LAVERNE D. GEIGER, Primary Examiner

EDWARD J. EARLS, Assistant Examiner

U.S. Cl. X.R.

137—15.1; 244—53